(12) United States Patent
Horche Trueba et al.

(10) Patent No.: US 8,082,841 B2
(45) Date of Patent: Dec. 27, 2011

(54) AUTOMATIC SQUEEZING MACHINE

(75) Inventors: Ignacio Horche Trueba, Alcorcón (ES);
Javier Aparicio Adaro, Alcorcón (ES)

(73) Assignee: Orange Juice Home, S.L., Madrid (ES)

( * ) Notice: Subject to any disclaimer, the term of this patent is extended or adjusted under 35 U.S.C. 154(b) by 1048 days.

(21) Appl. No.: 11/922,187

(22) PCT Filed: Jan. 11, 2006

(86) PCT No.: PCT/IB2006/000033
§ 371 (c)(1),
(2), (4) Date: Dec. 12, 2007

(87) PCT Pub. No.: WO2006/048850
PCT Pub. Date: May 11, 2006

(65) Prior Publication Data
US 2009/0038484 A1 Feb. 12, 2009

(30) Foreign Application Priority Data
Jun. 13, 2005 (ES) .................................. 200501489

(51) Int. Cl.
*A23J 1/00* (2006.01)
(52) U.S. Cl. ................. 99/502; 99/504; 99/509
(58) Field of Classification Search ................. 99/302 P, 99/289 R, 302 R
See application file for complete search history.

(56) References Cited

U.S. PATENT DOCUMENTS

| | | | | |
|---|---|---|---|---|
| 806,279 A * | 12/1905 | Nickell | ............................. | 99/502 |
| 2,295,922 A * | 9/1942 | Weston | ............................. | 99/503 |
| 2,629,317 A * | 2/1953 | Nelson | ............................. | 100/208 |
| 3,807,297 A | 4/1974 | Marrie | | |
| 4,821,635 A * | 4/1989 | Logan, Jr. | ....................... | 99/538 |
| 5,339,729 A * | 8/1994 | Anderson | ....................... | 99/509 |
| 5,483,870 A * | 1/1996 | Anderson et al. | ............... | 99/510 |
| 6,186,057 B1 * | 2/2001 | Cremades Del Toro | ........ | 99/503 |
| 6,634,280 B2 * | 10/2003 | Sowden et al. | .............. | 99/302 P |
| 2006/0169152 A1 * | 8/2006 | Lin et al. | .......................... | 99/495 |
| 2010/0018403 A1 * | 1/2010 | Hoare et al. | .................... | 99/281 |
| 2010/0058941 A1 * | 3/2010 | Rivera | ............................. | 99/513 |

FOREIGN PATENT DOCUMENTS

| | | |
|---|---|---|
| EP | 1 053 710 A | 11/2000 |
| SE | 322 877 B | 4/1970 |

* cited by examiner

*Primary Examiner* — Gene Kim
*Assistant Examiner* — John E Simms, Jr.
(74) *Attorney, Agent, or Firm* — Thompson & Knight LLP; James J. Murphy

(57) ABSTRACT

A squeezing machine whose actual squeezing element is formed mainly of a cone or rotating head which, apart from the rotating movement, has upward or downward movement depending on the point in the squeezing operation, on which there is a set of blades in the form of fins in such a way that the fruit is deposited on said blades and when these are pushed by the rotating cone in its upward path exert pressure on the fruit, slicing this vertically and guiding it towards the cone for crushing the pulp, as the fruit cannot escape through being trapped in the recess inside a dome that may consist of two parts, one of them moving, in such a way that as it moves it leaves open a hole communicating the squeezing element with a bin containing the fruit to be squeezed, allowing in a fruit previously aligned with said hollow by means of a pulling system.

18 Claims, 10 Drawing Sheets

AUTOMATIC SQUEEZING MACHINE

OBJECT OF THE INVENTION

As its name indicates, this invention consists of a squeezing machine whose actual squeezing element is mainly made up of a cone or rotating head which, apart from its rotary movement, moves upwards or downwards at different points in the squeezing operation, wherein there are a number of fin-shaped radial blades on said cone that are considerably higher at their ends so that the fruit is centred on said blades by the effect of gravity, and which, when these are driven by the rotary cone in its upward stroke, exert pressure on the fruit, slicing this vertically and guiding it towards the cone for crushing its pulp, since the fruit cannot escape through being trapped inside the hollow interior of a dome which encloses the assembly. In said dome there is an opening hole which by means of an opening and closing device synchronised with fruit pulling systems, allows in the fruit to be squeezed in an orderly and regulated way from a tray whose base, preferably circular, is part of the dome strictly speaking. Said opening hole, through which the fruit is automatically fed into the squeezer, can be replaced with a simple dome formed in an opening cover so that the fruit is fed in manually.

PRIOR STATE OF THE ART

There are different machines and methods available for automatically squeezing fruit, patents P9701407 and P9901055 deserving mention for the present purposes.

In both patents, each with its specialities, the squeezer mechanism is formed of a rotary cone with the function of crushing the fruit's pulp, a set of blades fitted on said rotary cone which cut the fruit and a cup dome at the top which, as it moves downwards, forces the fruit against the blades and against the rotary cone. The squeezing sequence can thus be summed up in that the fruit reaches the cavity existing between the cup and the blades by different pulling means, being lodged there, and then said cup starts to move downwards and, by exerting pressure on the fruit, slices this up through the effect of the blades on which this is placed, so as the fruit is cut, this gradually drops between the gaps between the blades, and meets the rotary cone which breaks up its pulp.

This squeezing system, with a rotary cone and lowering cup, entails different problems in practice due to the tensions that have to be borne by the arm which connects the dome with the guide for its movement, meaning that this point of connection has to be reinforced and thus complicating the action of inserting fruit into the machine since either the arm which connects the dome with the movement guide goes through this dome, causing a weak coupling or, to prevent said weakness, the space between the blades and the dome is extended to allow lateral entry of fruit, which means the machine has to be oversized.

Apart from this, any outer part of a machine with movement, such as the dome in this case, generates a risk in its use and an added factor of possible breakdowns through there being greater possibilities of it encountering an obstacle in its path which might spoil it or force it, or in the event of locating a piece of some size, as is the case of the dome, inside the machine, this means the size of the machine has to be increased, which may affect its marketing potential.

DESCRIPTION OF THE INVENTION

To overcome the problems described a squeezing machine is presented of the sort which consists of a rotary cone, a set of blades and an upper cup, whose essential characteristic is that in the squeezing sequence it is the rotary cone, making use of rotary force, which rises until it meets the dome, the fruit feeding also being done automatically through the dome itself consisting of two parts, one fixed and the other opening, set in the base of a an upper tray which houses the fruit while this is waiting to be squeezed, although the feeding operation can be done manually replacing the tray with an opening cover which would house a preferably single-piece dome inside it.

To provide the upwardly moving effect of the rotary cone, descending after squeezing the fruit, the motor rotation is transmitted by means of a pulley, belt or some other means, to a tubular part, with smooth internal walls, which houses a spindle inside it. Said spindle has a base crossed by a piece projecting at its sides and which is housed in longitudinal slots which cross the tubular part mentioned so that both pieces move together as these rotate but the spindle is free to start an upward or downward movement guided by the lateral slots of the tubular part stated above.

This upward or downward movement of the spindle is achieved thanks to the upper part of this screwing into a fixed nut which means that when rotating, the spindle moves upwards or downwards depending on the rotation direction.

The upper nut, anchored at the end of the spindle, houses the rotary cone in such a way that, when the spindle goes through said nut upwards through the rotation effect, it will force the upward movement of the rotary cone to which both the rotary movement and the upward or downward movement are thus transmitted.

Discrimination between upward movement or downward movement is ensured by two switches or sensors, one at the beginning and the other at the end of the spindle travel, or of any other item covering this distance, which will alternate the polarity of the motor current.

The cutting blades are set on the cone rotation axle, secured by a rod which goes into the spindle, but these blades do not turn together with the cone since, through projections or similar items incorporated in these, they are inserted into guides made on the internal side of the cylindrical casing which houses the squeezing assembly, thus making the rotary cone, in its upward movement, push the blades which will similarly move along the aforementioned guides, but without transmitting the rotation through the containing effect of these same guides.

The squeezer assembly is finished off by a dome or cup which retains the fruit while the blades act on this, cutting it up, and then the rotary cone, crushing the pulp and extracting the juice.

This dome has vertical slots which will allow the blades through this in such a way that the rotary cone can, at its uppermost point, practically fit right against the internal side of the aforementioned dome, being calibrated to leave sufficient distance to prevent the fruit peel or rind from being crushed and releasing bitter-flavoured essential oils.

Since not all fruit has peel of the same thickness, however, the invention envisages the fixed nut consisting of two parts so that a spring can be fitted between them, and, in the event of the rotary cone reaching the fruit peel and the pressure to be overcome thus being greater, it absorbs the remaining travel of the spindle in such a way that the rotary cone's continuing upward movement is prevented, thus stopping the fruit peel from being crushed.

The dome or cup which was mentioned above consists of two parts in the form of clearly differentiated semi-domes, one fixed and one opening, in which the latter, at a specific point in the squeezing process, moves exposing a hole in the dome big enough to allow a new fruit into the squeezing element.

This compound dome prepared for automatic feeding of fruit can be replaced with a simple dome which, like a cover of the squeezer assembly, allows the fruit to be fed in manually.

Going on with the squeezing sequence as described up to here, after crushing the fruit pulp, the juice slides down the sides of the rotary cone, falling on to a filter which pours it into a tray, which in turn supplies the juice through a tap or similar.

Apart from this, after the blades have completed the cut, the different pieces of peel or rind fall through the effect of gravity onto the filter and are ejected into a container bin by centrifugal force due to the rotation of the cone.

This ejection phase is assisted by the geometry of one of the blades, which helps to guide the peel towards the hole which communicates with the container bin.

Another of the questions which have been envisaged is that of providing the squeezing machine with a simple assembly and dismantling system to facilitate cleaning this and the machine has thus been divided into three clearly differentiated parts, these being the mechanical part, the casings forming the body of the machine and the squeezer element with the automatic feeding tray included which is located in said body in which the automatic supply tray can be replaced with an opening cover forming a simple dome, enabling the fruit to be fed in manually.

The mechanical part, consisting mainly of the motor and the rotation transmission to the squeezer axis, is located on the support base and protected by a removable perimeter housing which rises up to the waist of the machine.

The middle body of the machine consists of a casing resting on the previous one and which houses inside the squeezer assembly, whose top broadens out to form the tray housing the automatic feeding device.

The machine, as has been stated, can come without the automatic fruit feeder so that the top of the squeezer element would consist of a dome of a single piece integrated in an opening cover allowing the fruit to be fed manually.

For purposes of understanding the above better a number of figures are included for illustrative and not limitative purposes.

PREFERABLE EMBODIMENT OF THE INVENTION

An embodiment of the invention is now explained, as this has been designed in its full form, that is the fully automatic machine both in its squeezing and its feeding process, although what has been described up to now and what is stated herein make it clear that this is not the only possible form of embodiment, since the same machine can be supplied with the automatic feed removed from it and replaced with a manual feeder.

Figure 9:
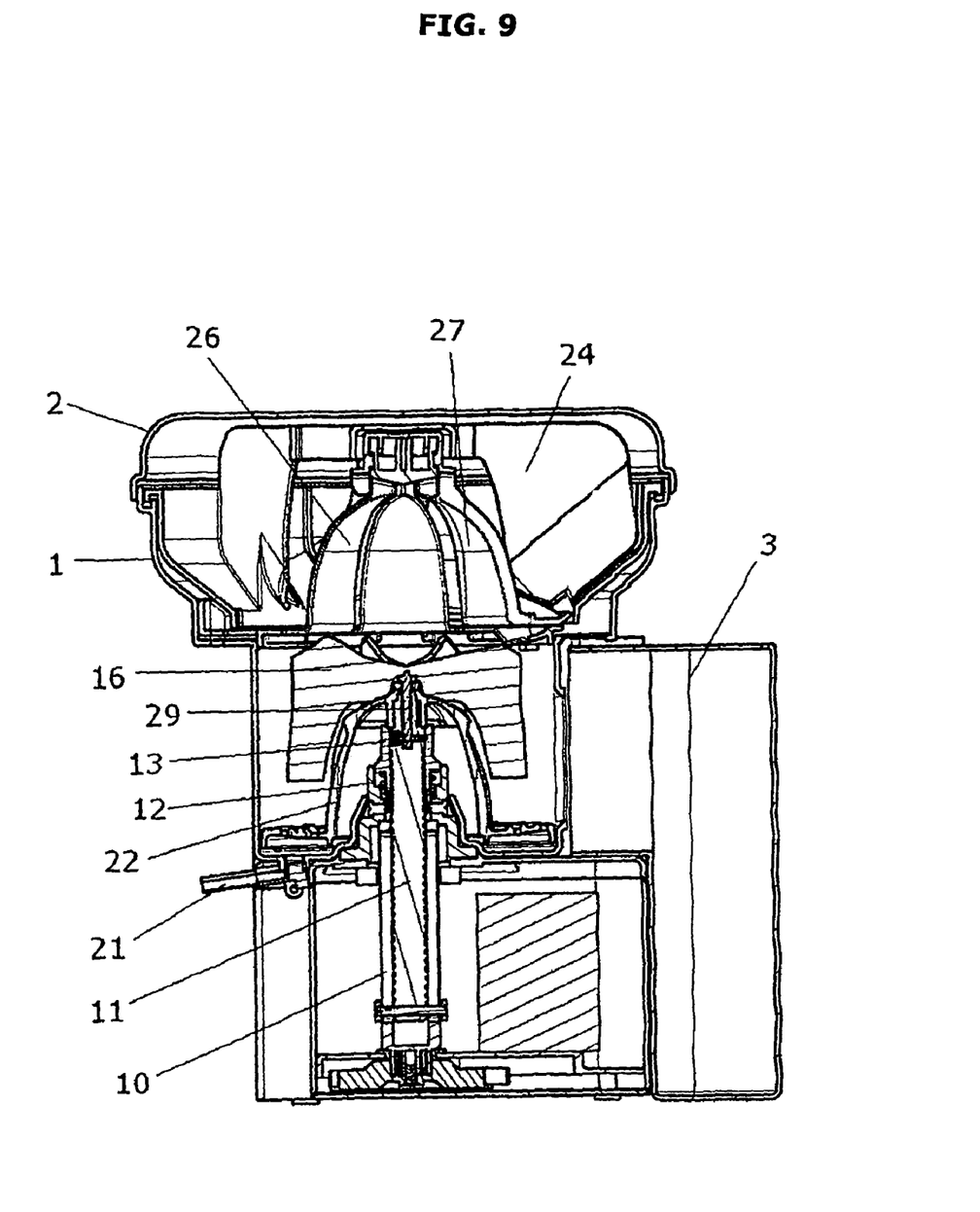
FIG. 9 shows a section of the assembled machine in which one can appreciate almost all its items, thus showing the cover which encloses the assembly (2), the tray which houses the automatic feed system (1), the peel container bin (3), the actual dome consisting of two parts (26) and (27), the part that contains the fins (24) the blades (16), the rotary cone (22) the tap (21), the compound fixed nut (12) and (13), the spindle (11) and the tubular part with smooth internal walls (10) as well as the rod which associates the blades with the spindle (29)

This invention, as has been explained, consists of a squeezing machine of the type in which the fruit is trapped between a hollow dome (26) and (27) and a series of blades (16) and, by pressure against these blades, is sliced and then squeezed by a rotary cone (22) which crushes its pulp, with the juice thus produced sliding towards a filter which pours it into a tray, the essential characteristic of the machine being both the squeezing system and the mechanism which allows this, the pressure causing the slicing and squeezing of the fruit being made by the upward movement of the rotary cone (22) which pulls up with it the blades (16) leading the fruit to be trapped by the dome (26) and (27).

Figure 1:
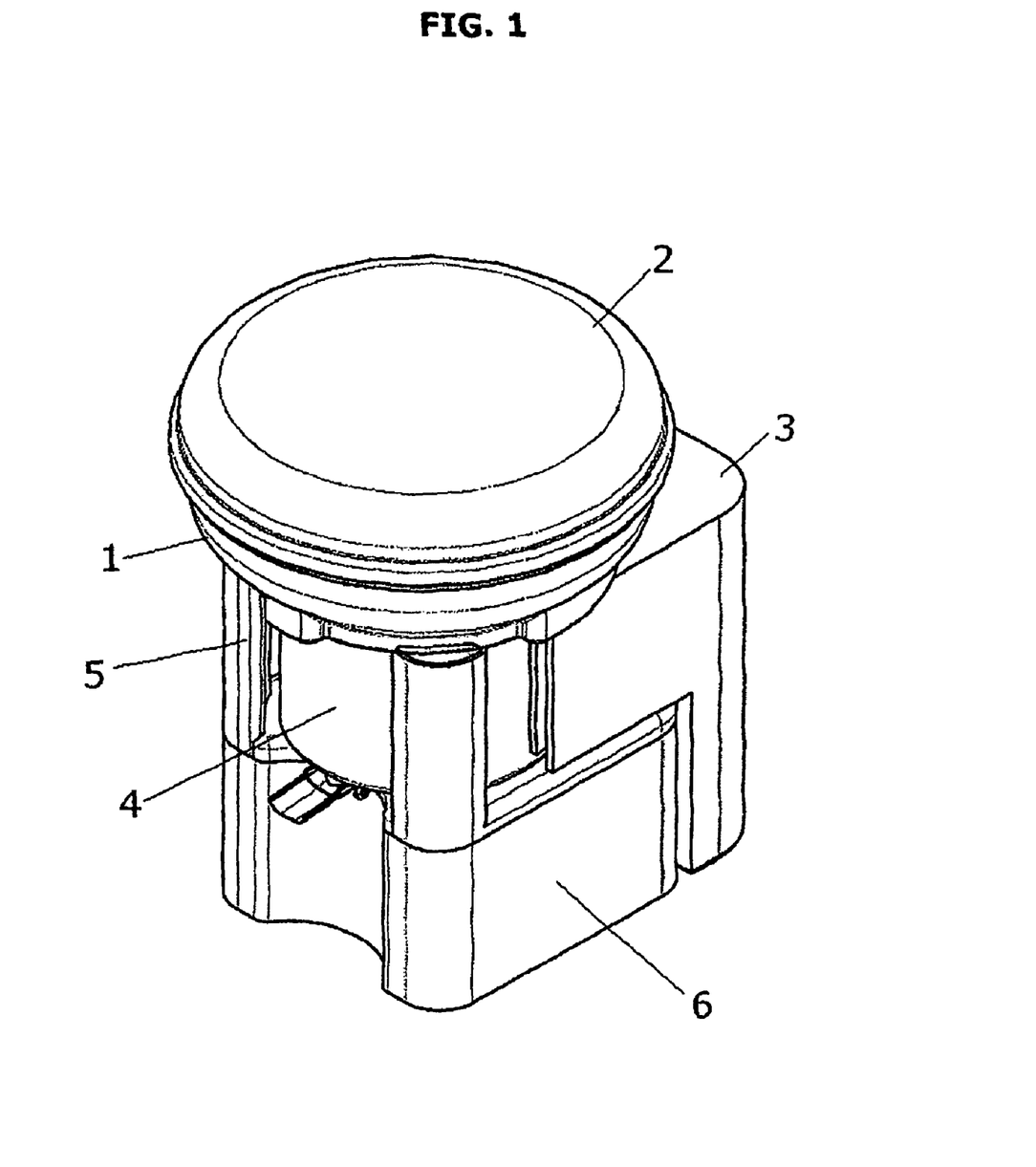
FIG. 1 represents a general view of the machine showing all its items fitted and the tray which houses the automatic feeder (1) with its protection cover (2), the bin for containing the peel (3), the squeezing assembly (4) integrated in the central casing (5) and the lower casing (6) inside which the motor and transmission are located.
Figure 2:
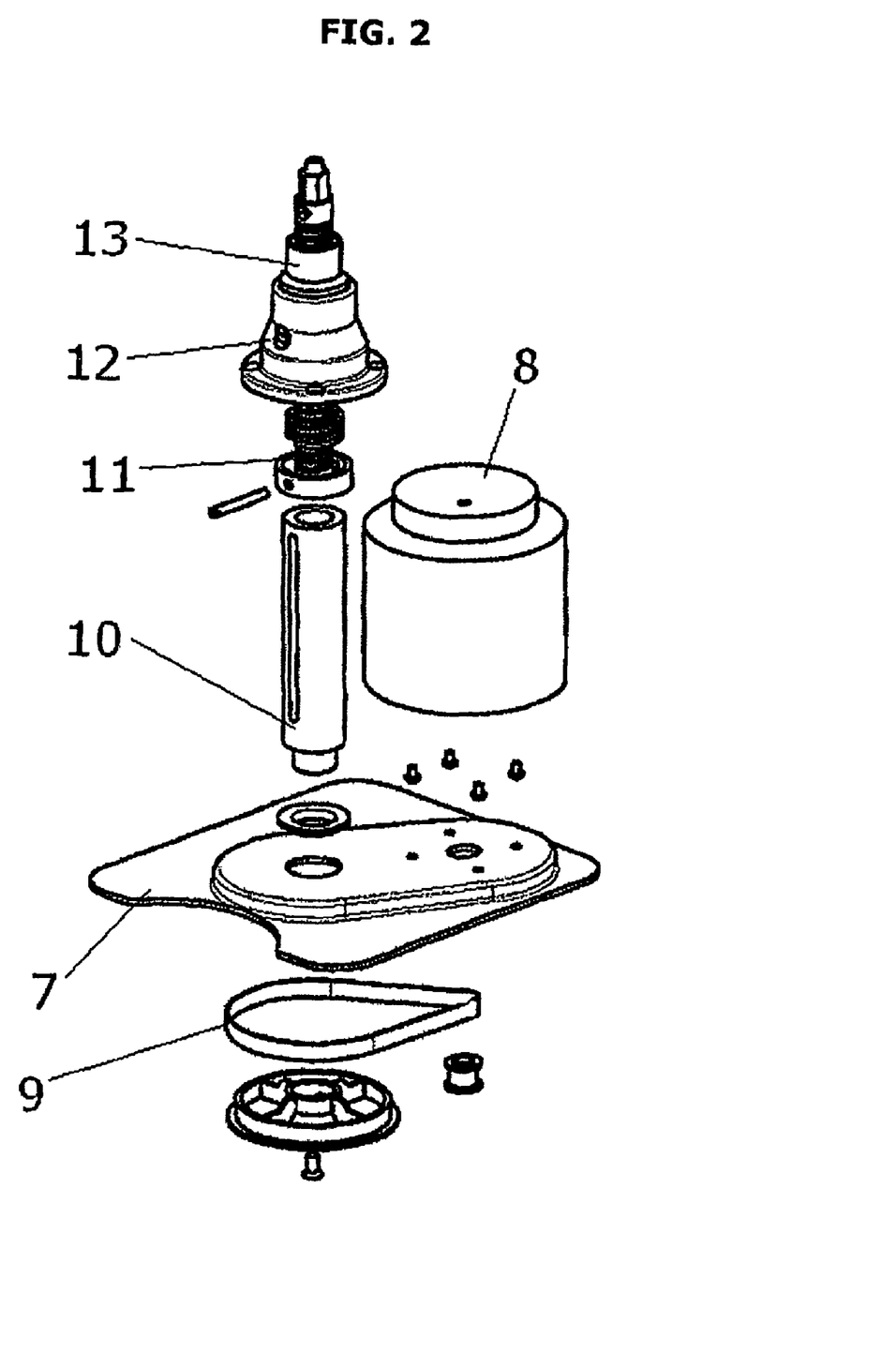
FIG. 2 shows a general view of the transmission mechanism showing the base of the machine (7), the motor (8) and the rotation transmission belts (9), the tubular part with laterally slotted smooth internal walls (10), and the spindle (11) inserted into the fixed thread consisting of two parts (12) and (13) one on top of the other.
Figure 3:
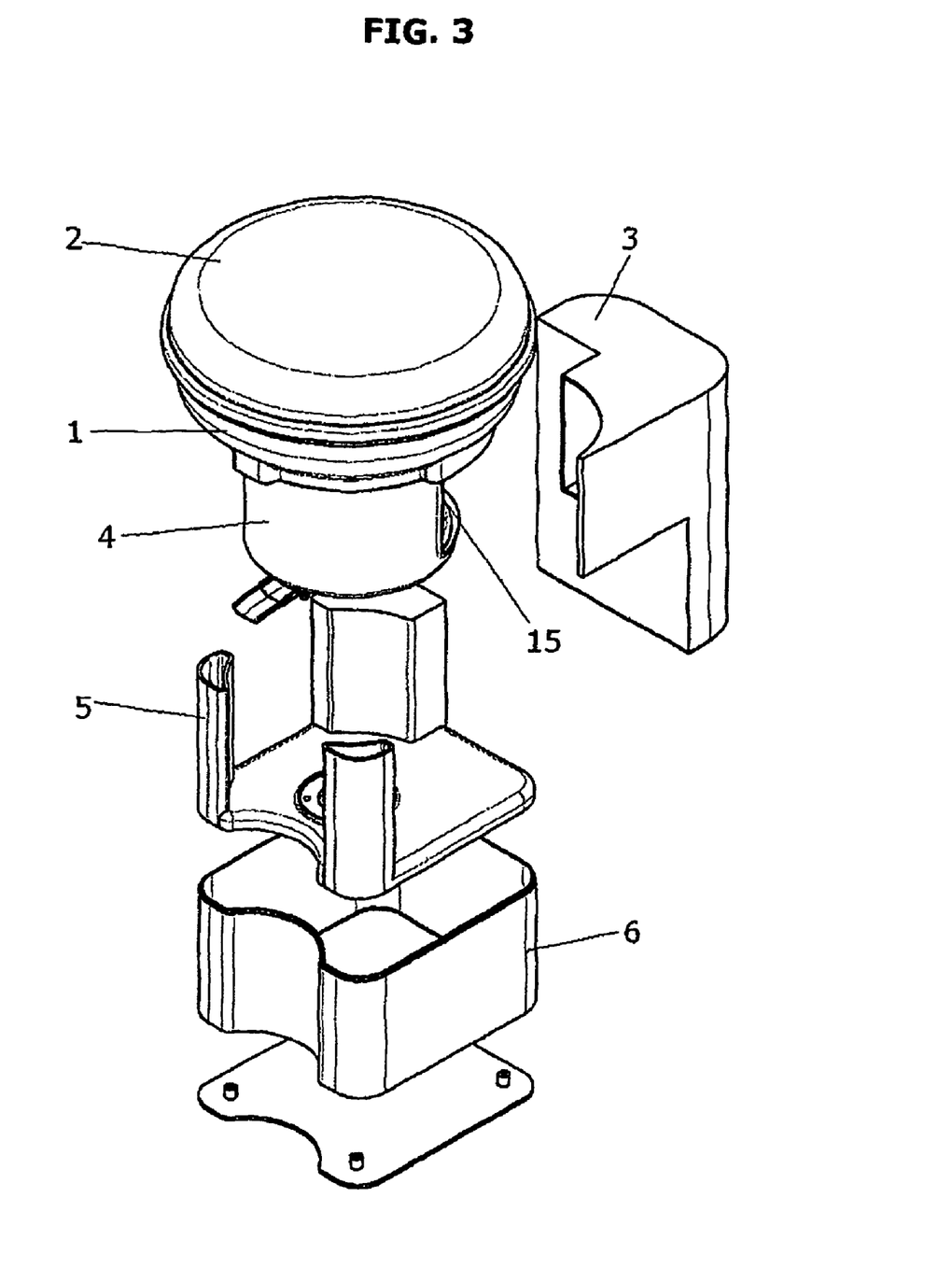
FIG. 3 shows the casings and main volumes forming the body of the machine and thus includes the lower casing (6) which houses the motor and transmission mechanism, the intermediate or central casing (5) intended for receiving the squeezing assembly (4) at the rear of which one can appreciate the opening (15) communicating with the peel container bin (3) also showing the tray (1) housing the automatic feeder closed by the protection cover (2).
Figure 8:
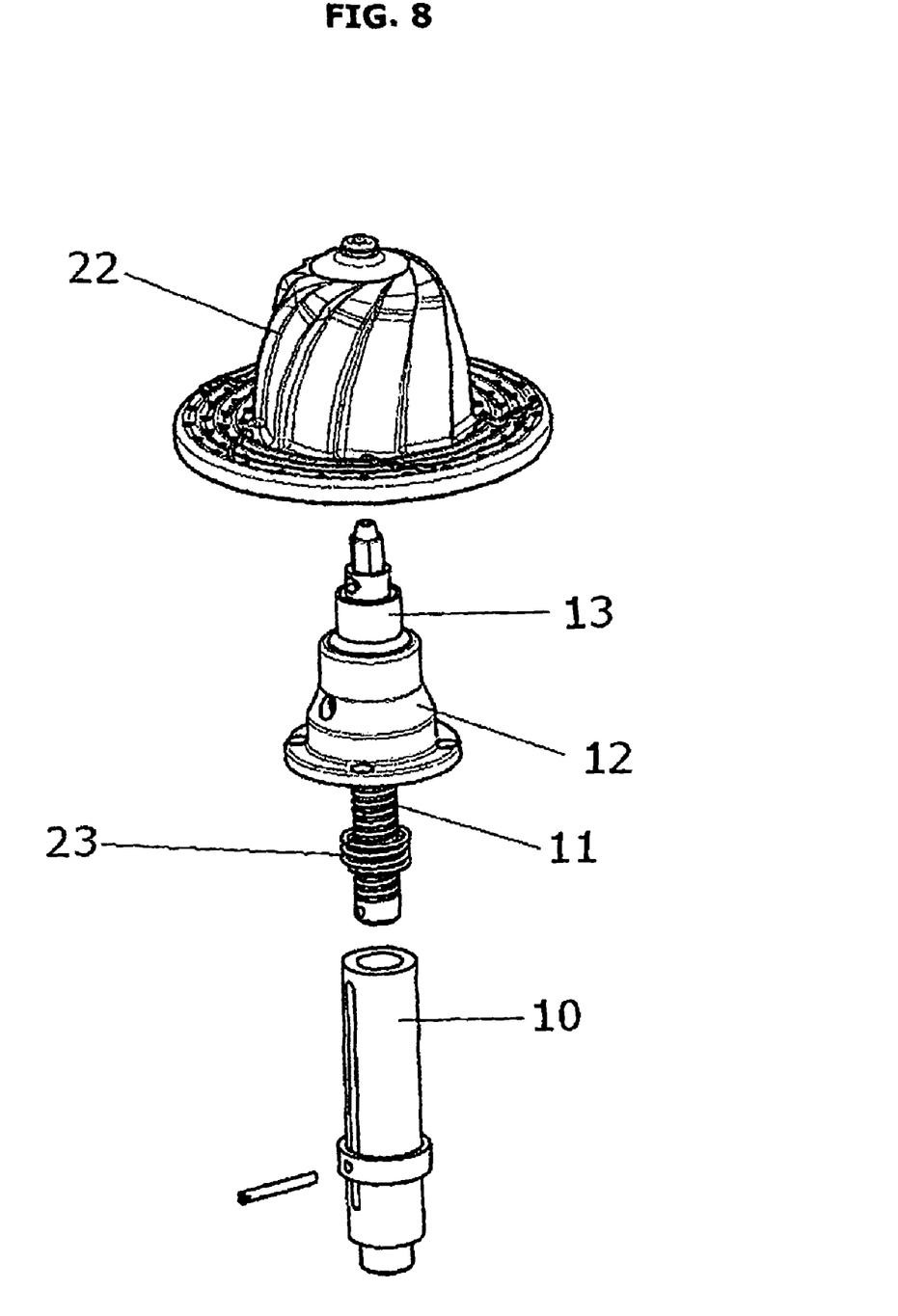
FIG. 8 shows the detail of the rotary cone (22) the tubular part with smooth internal walls (10), the spindle, the compound fixed thread (12) and (13) and the spring (23) intended to be located between both parts of the thread to absorb part of the spindle displacement when there is a change in the pressure at the end.

The mechanism by means of which this effect is obtained consists of a motor (8) whose rotation is transmitted to a tubular part (10), with smooth internal walls and with at least one longitudinal slot in which said part houses inside it a spindle (11) with at least one protuberance, which is inserted in the longitudinal slot/s mentioned above in such a way that, when the tubular part (10) turns, it pulls along with it the inner spindle (11) which is nevertheless free to be able to go up or down, being guided by the lateral slots of the tubular part.

The aforementioned spindle threads, at the top, into a fixed nut consisting of two parts (12) and (13) one on top of the other, which through the effect of the spindle rotation move this upwards or downwards depending on the rotation direction.

Figure 5:
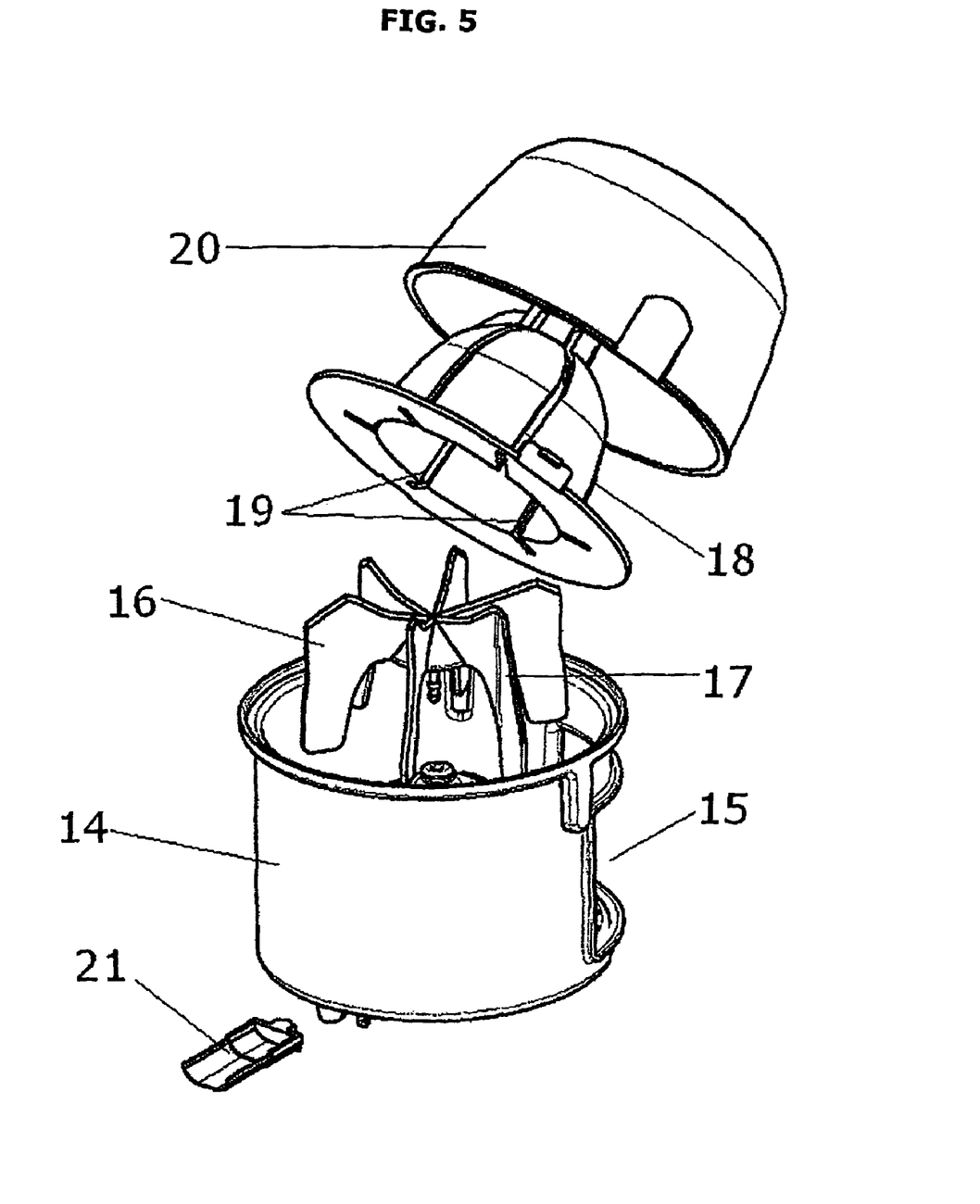
FIG. 5 shows the alternative proposed for manually feeding the machine and hence one can see the squeezer element except for the rotary cone, which consists of the outer cylinder which contains this (14) with a rear opening (15) which gives onto the peel container bin, the blades (16), one of which has an extension (17) to guide the peel towards the container bin, also showing the dome (18) with the slots that allow the blades through on their upward movement (19) and the protection cover which covers the dome (20), being able to see the tap or channel which allows the juice out (21) at the bottom.

When the squeezing process starts, the spindle is in the lower position and through the effect of the rotation and the fixed nut it rises, pushing up the rotary cone and the blades with it in such a way that the cone rotates along with the spindle, while the blades do not turn through the effect of projections which engage in guides in the interior walls of the cylinder containing the squeezer element (14), these guides and a rod which inserts into the spindle (29) allowing the upward and downward movement of the blades and preventing any possible rotation that might arise through friction with the spindle or the cone.

After the squeezing sequence starts, the fruit, located on the blades, rises pushed by these until this is trapped in the inner part of the dome or cup (18), meaning that, as the blades follow their upward path, they start the cutting process, making the pieces stemming from the cutting operation slide between the blades, being pressed and their pulp crushed by the rotating cone (22).

On their way up, the blades go into the same number of vertical slots in the dome (19) in such a way that the cone can go up to the uppermost position, with the cone and dome practically fitting together, thus ensuring total separation of the different parts of the fruit.

To prevent any excessive pressure of the cone on the fruit peel from crushing this and thus releasing essential oils and other liquids from the peel that may have a bitter taste, inside the fixed nut, between its two parts (12) and (13) there is a spring (23) which yields to excess pressure and prevents the cone from continuing upwards, thus neutralising the upward effect of the spindle and preventing the cone from managing to affect the peel or rind.

Figure 4:
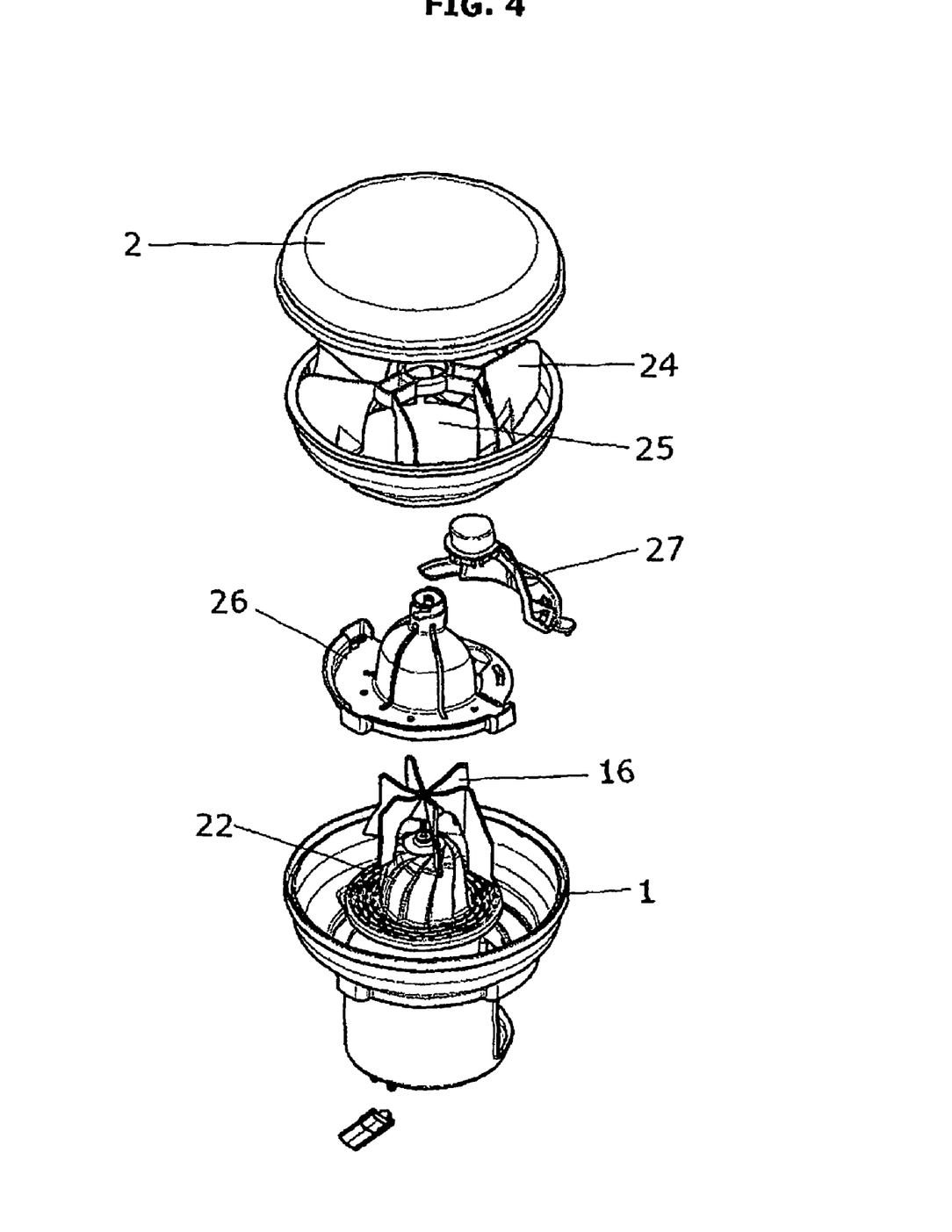
FIG. 4 shows in detail the different items forming the squeezer assembly with the automatic feeder integrated and one can thus see the upper protection cover (2), the tray (1) inside which the circular piece containing the fins (24) is located, and which when turning move the fruit lodged in the gaps between them, also being able to see the lack of a base of said tray (25) prepared to couple, as a base, with the assembly consisting of the dome divided into two (26) and (27) under which we find the cutter blades (16) and the rotary cone (22).

The upper part of the squeezer element can be defined as an automatic fruit feeder essentially made up of a tray inside which, forming part of the base, this houses the retaining dome consisting of two semi-dome items (26) and (27) in which one of these is fixed while the other moves synchronically with the circular part which contains the fins pulling the fruit (24).

When the machine is at rest, the moving part of the dome (27) moves sideways, pulling along with it the circular part (24) and thus the fins, with the fruit contained in the gaps between these, so that the point of total aperture of the semi-dome item coincides with when the fruit to be squeezed has been lifted against the open hole and, through the very geometry of the place where it is resting and thanks to guides which minimise the friction, it falls inside the squeezer element through the effect of gravity, being lodged also by gravity in the centre of the assembly formed of the blades, since these are higher at their ends than at the centre.

When the fruit has got to this position, the moving semi-dome part returns to its original position, this time without pulling along with it the circular part which contains the fins, stopping over the hole thanks to a series of anchorages through its geometry which prevent this moving part from yielding or oscillating, as the fruit is pushed against the dome.

Figure 6:
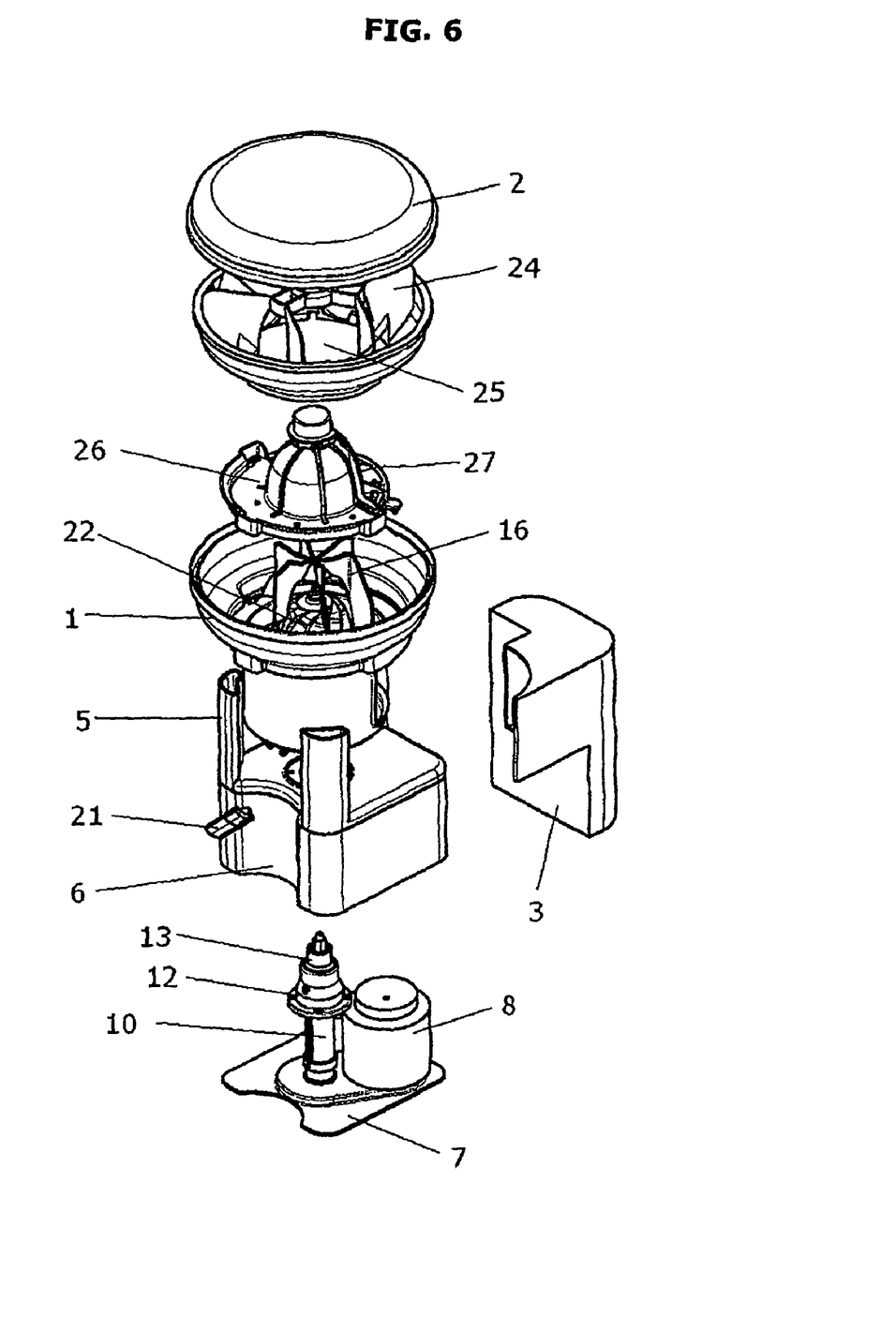
FIG. 6 shows the full machine, with the upper protection cover (2), the tray (1) inside which the circular item containing the fins (24) will be located and which, when turning, move the fruit lodged in the spaces between the fins, also being able to observe the lack of a base for this tray (25) prepared to couple, as a base, with the assembly formed of the dome divided into two (26) and (27) under which there are the cutter blades (16) and the rotary cone (22), the central (5) and lower (6) casings, the tap (21), the motor (8), the base of the machine (7), the tubular part with smooth internal walls (10), the fixed thread consisting of two parts (12) and (13) one on top of the other, and the peel container bin (3).

The aforementioned squeezer item, as well as the other items from the squeezing machine, are located in a body made up of different casings (5) and (6) which are easy to dismantle and clean as described below.

The mechanical part, consisting of the motor and transmission, is located on the base of the machine (7) being protected around its perimeter by a casing (6) which rises up to the waist of the machine.

On this casing another one is inserted (5), with a hole to allow through the spindle on which the squeezer assembly will be inserted, this casing being the middle body of the machine housing inside the squeezer item with the automatic feeder, where applicable.

Figure 7:
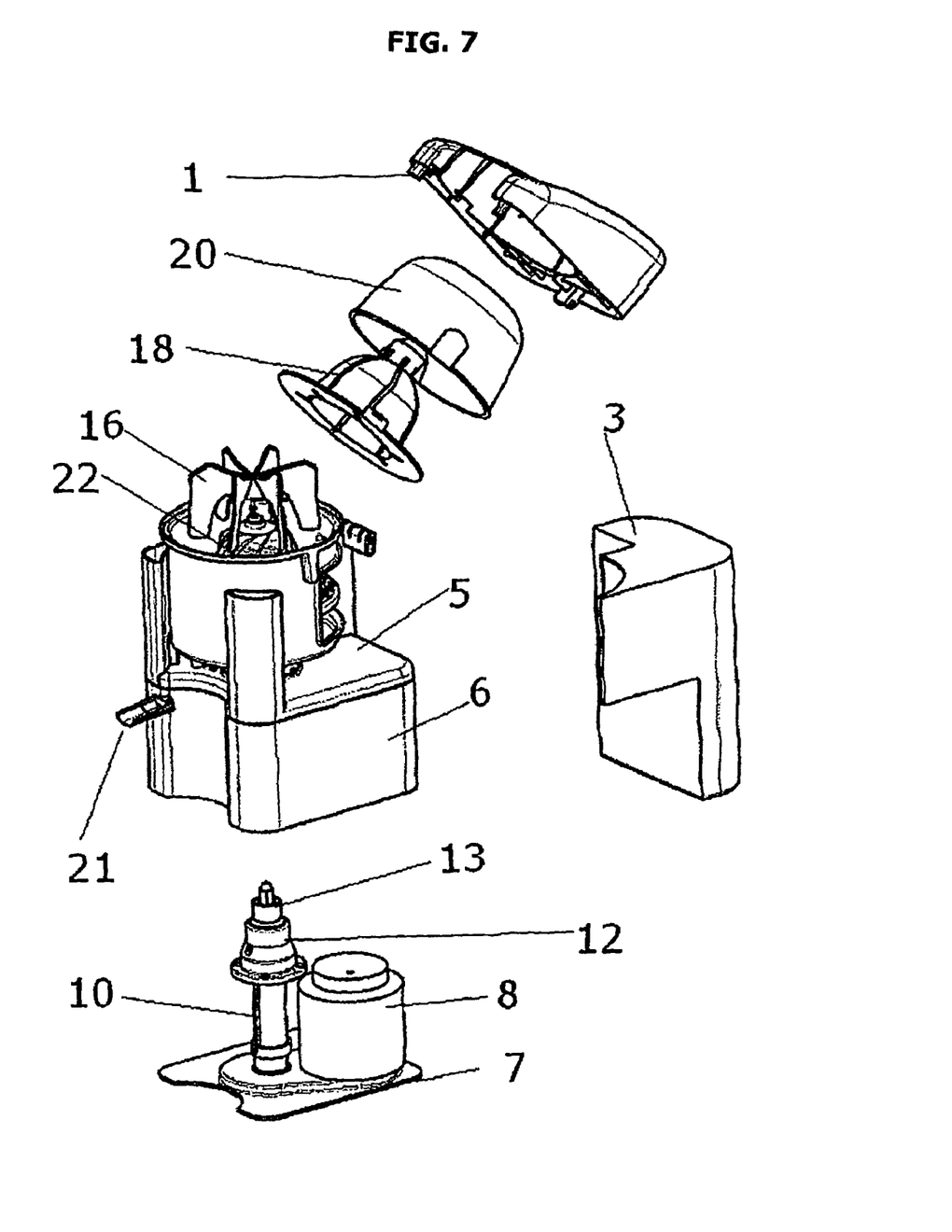
FIG. 7 shows the full machine, with the manual feeding option, in which one can see the opening cover (28) the dome protection cover (20), the blades (16), the central (5) and lower (6) casings, the rotary cone (22), the tap (21) the motor, the base of the machine (7), the tubular part with smooth internal walls (10), the fixed thread consisting of two parts (12) and (13) one on top of the other and the peel container bin (3).
Figure 10:
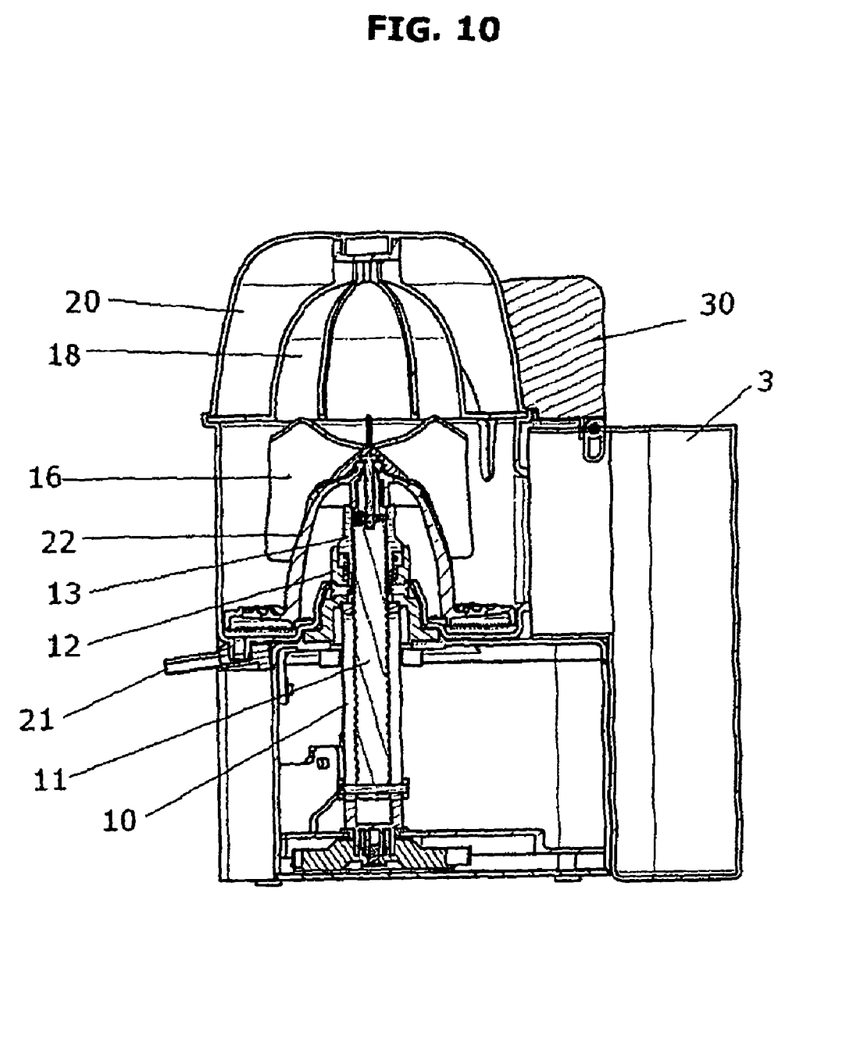
FIG. 10 shows a section of the machine set up in its manual feeding option in which one can appreciate almost all its items, such as the opening cover (30) which houses the dome (18) and its protector (20), the peel container bin (3), the blades (16), the rotary cone (22) the tap (21), the compound fixed nut (12) and (13), the spindle (11) and the tubular part with smooth internal walls (10).

In the embodiment of the invention intended for feeding the machine manually, the opening cover (28) is fitted on the assembly, this being the support which houses the dome (18) and its outer protector (20).

What is claimed is:

1. An automatic squeezing machine comprising:
a dome for retaining fruit;
a set of blades disposed under the dome for slicing the fruit vertically by pressure and guiding resulting sliced fruit towards a rotating cone supporting the set of blades, the rotating cone for crushing pulp and extracting juice, wherein the rotating cone performs dual movements of rotation and upward and downward displacement such that at a start of a squeezing cycle the rotating cone and the set of blades are at a lowest position and during the squeezing cycle the rotating cone and the set of blades move upwards such that the blades slice the fruit and the rotating cone crushes the pulp, after which the rotating cone and the set of blades move downward for expelling surplus peel by centrifugal force; and
a mechanism for moving the rotating cone and the set of blades comprising:
a motor for rotating a tubular part;
a spindle inside the tubular part, and means for allowing the tubular part and the spindle the tubular part and the spindle to turn together and the spindle to freely move upward and downward, the spindle engaging the rotating cone such that the rotating cone and the spindle rotate and move upward and downward together;
a fixed nut fastened onto an end of the spindle, the fixed nut causing the spindle to move upward or downward, depending on the rotation direction of the spindle, to thereby rotate the rotating cone and displace the rotating cone and the supported set of blades upward and downward; and a cylindrical housing for housing and vertically guiding the set of blades, the cylindrical housing having internal walls with insertions engaging the set of blades, for preventing rotation of the set of blades.

2. The automatic squeezing machine of claim 1, wherein the tubular part includes smooth internal walls having at least one longitudinal slot for engaging a projection on the spindle.

3. The automatic squeezing machine of claim 2, wherein the internal walls of the tubular part have a plurality of longitudinal slots for engaging a corresponding number of projections on the spindle.

4. The automatic squeezing machine of claim 1, wherein the end of the spindle is threaded into the fixed nut.

5. The automatic squeezing machine of claim 1, wherein the fixed nut comprises at least two parts, and the mechanism for moving further comprises a spring fitted between the at least two parts for absorbing remaining travel of the spindle in the event of increasing pressure on the rotating cone.

6. The automatic squeezing machine of claim 1, wherein the set of blades comprise a set of vertical fins with a sharp edge at the top and are disposed substantially radially from a center point.

7. The automatic squeezing machine of claim 6, wherein at least one of the blades has an extension extending towards an inner wall of the cylindrical housing for directing peel through an aperture through the cylindrical housing by centrifugal force.

8. The automatic squeezing machine of claim 1, wherein the cylindrical housing includes an internal wall having at least one slot for braking rotation of the set of blades due to friction between the set of blades and the rotating cone.

9. The automatic squeezing machine of claim 1, wherein the dome includes slots through which the set of blades extend during upward movement of the set of blades and the rotating cone allowing the rotating cone to substantially fit within the dome.

10. The automatic squeezing machine of claim 1, wherein the dome is integrated in a base of a feed bin for containing the fruit waiting to be squeezed.

11. The automatic squeezing machine of claim 1, wherein the dome comprises a first fixed part and a second moving part, wherein when the second moving part is displaced from a closed position to an open position a space is created allowing communication between a bin containing fruit to be squeezed and the inside of the dome.

12. The automatic squeezing machine of claim 11, wherein the bin comprises a set of vanes surrounded by a circular piece dividing the bin into a series of sections into which the fruit is located.

13. The automatic squeezing machine of claim 12, further comprising means for moving the second moving part of the dome from the closed position to the open position to create the space, and means for moving the circular piece synchronously with the second moving part of the dome for pushing forward fruit in front of the space to allow the fruit to drop into the dome.

14. The automatic squeezing machine of claim 13, wherein after the fruit has dropped inside the dome, the means for moving the second moving part moves the second moving part of the dome back to the closed position and the means for moving the circular piece disengages the circular piece of the bin from the second moving part of the dome.

15. The automatic squeezing machine of claim 1, wherein the dome is formed of a single piece and is covered by a protection cover, wherein the protection cover is removable from the dome for cleaning and the set of blades are covered during operation of the automatic squeezing machine.

16. The automatic squeezing machine of claim 15, wherein the dome and the protection cover are integrated in a unit allowing manual opening of the squeezing machine and manual feeding of fruit.

17. The automatic squeezing machine of claim 1, wherein the squeezing machine comprises a body including a base for supporting the motor, the tubular part, and the spindle and a casing extending upward from the base for enclosing the motor, the tubular part, and the spindle.

18. The automatic squeezing machine of claim 17, further comprising another removable casing for enclosing the rotating cone and the set of blades.

* * * * *